J. W. HARBIN.
Seed-Planter.
No. 30,445. Patented Oct 16, 1860.
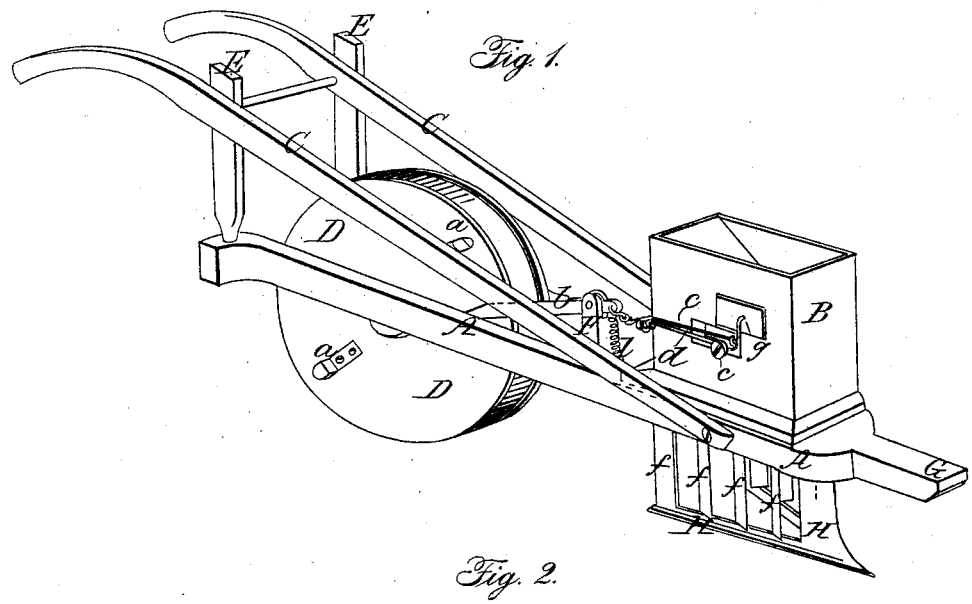
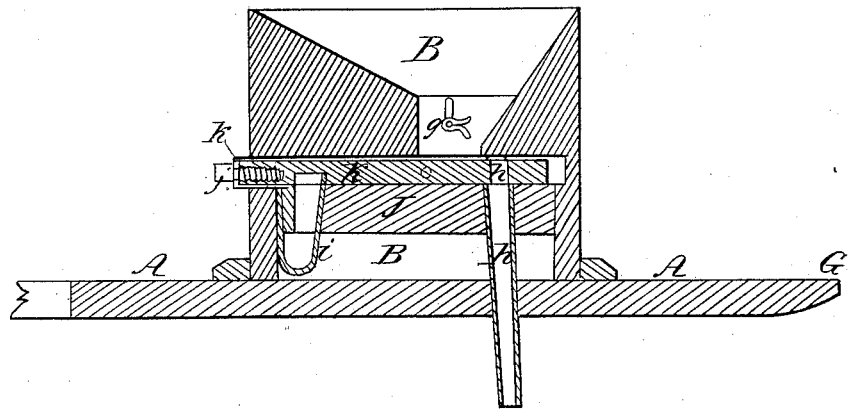
Witnesses:
Inventor:

UNITED STATES PATENT OFFICE.

J. W. HARBIN, OF DELAWARE STATION, INDIANA, ASSIGNOR TO HIMSELF AND R. S. WILLIS, OF SAME PLACE.

IMPROVEMENT IN CORN-PLANTERS.

Specification forming part of Letters Patent No. 30,445, dated October 16, 1860.

*To all whom it may concern:*

Be it known that I, J. W. HARBIN, of Delaware Station, in the county of Ripley and State of Indiana, have invented certain new and useful Improvements in Seed-Planters; and I do hereby declare that the following is a full, clear, and exact description thereof, reference being had to the accompanying drawings, and to the letters of reference marked thereon, making a part of this specification, in which—

Figure 1 represents a perspective view of my improved seed-planter, and Fig. 2 represents a longitudinal section through the seed-box.

To enable those skilled in the art to manufacture and use my improved seed-planter, I will proceed to describe the construction, operation, and arrangement of the same.

My invention relates to an improved mechanical arrangement of devices for operating the agitator and the slide of the seed-hopper.

A is the frame of the machine. B is the hopper or seed-box, and C C are handles, which are attached to the forward part of frame A, and supported by the supports or standards E E, as shown.

D is a presser or traction wheel, upon which are small projections $a$ $a$, and these act upon and operate the lever $b$, thereby communicating motion to the slide K in the interior of the hopper. The lever $b$ is pivoted to a standard, F, and near the standard is connected with two rods, $c$ $d$, by means of a link. The rod $c$ communicates motion to the agitator $g$, being connected to a crank which is attached to the agitator. A small spiral spring, $l$, is placed under the end of the lever $b$, and is attached to said lever for the purpose of throwing it back in the same position it was before passing the projection on the traction-wheel D.

H is a double share, for the purpose of forming the furrows in the ground for the reception of the seed. It (the share H) is provided with a number of peculiarly-formed wings or coverers, $f$ $f$, arranged vertically upon its diverging sides, as shown in Fig. 1, said wings serving the purpose of pulverizing the earth displaced by the front end of the share, and returning fine earth to the furrow, so as to cover therewith the seed which has been deposited in the furrow.

$g$ is the agitator, operated by the rod $c$, and serves to keep the seed from arching over the small aperture in the hopper by which it would be prevented from falling into a small chamber, $h'$, from which it is delivered into the tube $h$, and thence to the ground.

The slide K is provided with a U-shaped spring, $i$, which forces the slide forward, letting the seed which may be contained in the chamber $h'$ descend the tube $h$ to the ground the moment the lever $b$ passes one of the projections $a$ $a$ on the surface of the traction-wheel D. This slide has an adjustable plate, $k$, on the upper surface for the purpose of increasing or diminishing the aperture through which the seed passes from the seed-box into the small chamber $h'$. The plate $k$ is adjusted to regulate the size of the aperture into the small chamber $h'$ by the screw $j$, which passes through the end of the plate $k$ and into the slide K, thereby adjusting the aperture, as described.

The hopper B is of rectangular form, and is made as shown in the drawings.

G is the draft-beam by which the machine is drawn.

The object of my invention is to produce a seed-planter which is simple in its construction, and which, having deposited the seed at equal distances in a furrow, covers it properly with pulverized earth, and then compresses the earth upon the seed to a suitable degree.

The operation of my machine is as follows: The seed to be planted having been placed in the hopper and the machine being drawn appropriately over the ground, the share H enters the earth, forming a furrow of a suitable depth. The roller D, being in contact with the ground, is caused to rotate, and one of the projections $a$, encountering in its revolutions the lever $b$, depresses it and communicates motion to the slide K and agitator $g$ by means of the connecting-rods $c$ $d$, thereby causing the seed to descend the tube $h$ and enter the furrow. The wings or coverers $f$ return the fine earth which has been thrown out by the share H, and covers the seed. The roller D passes over the ground and slightly compresses it.

Having described my improved seed-planter, what I claim as my invention, and desire to secure by Letters Patent, is—

The arrangement of the spring-lever *b*, supported by the standard F, and operated by the projecting pins *a a* upon the traction-wheel D, in connection with the rod *d*, operating the spring-slide K, and the rod *c*, operating the agitator *g*, in the manner as and for the purposes set forth.

J. W. HARBIN.

Witnesses:
WM. CLOUGH,
S. K. GRAVES.